May 6, 1958 M. SMITH 2,833,428
SELF-LOADING AND UNLOADING APPARATUS FOR MOTOR VEHICLES
Filed June 26, 1956 2 Sheets-Sheet 1
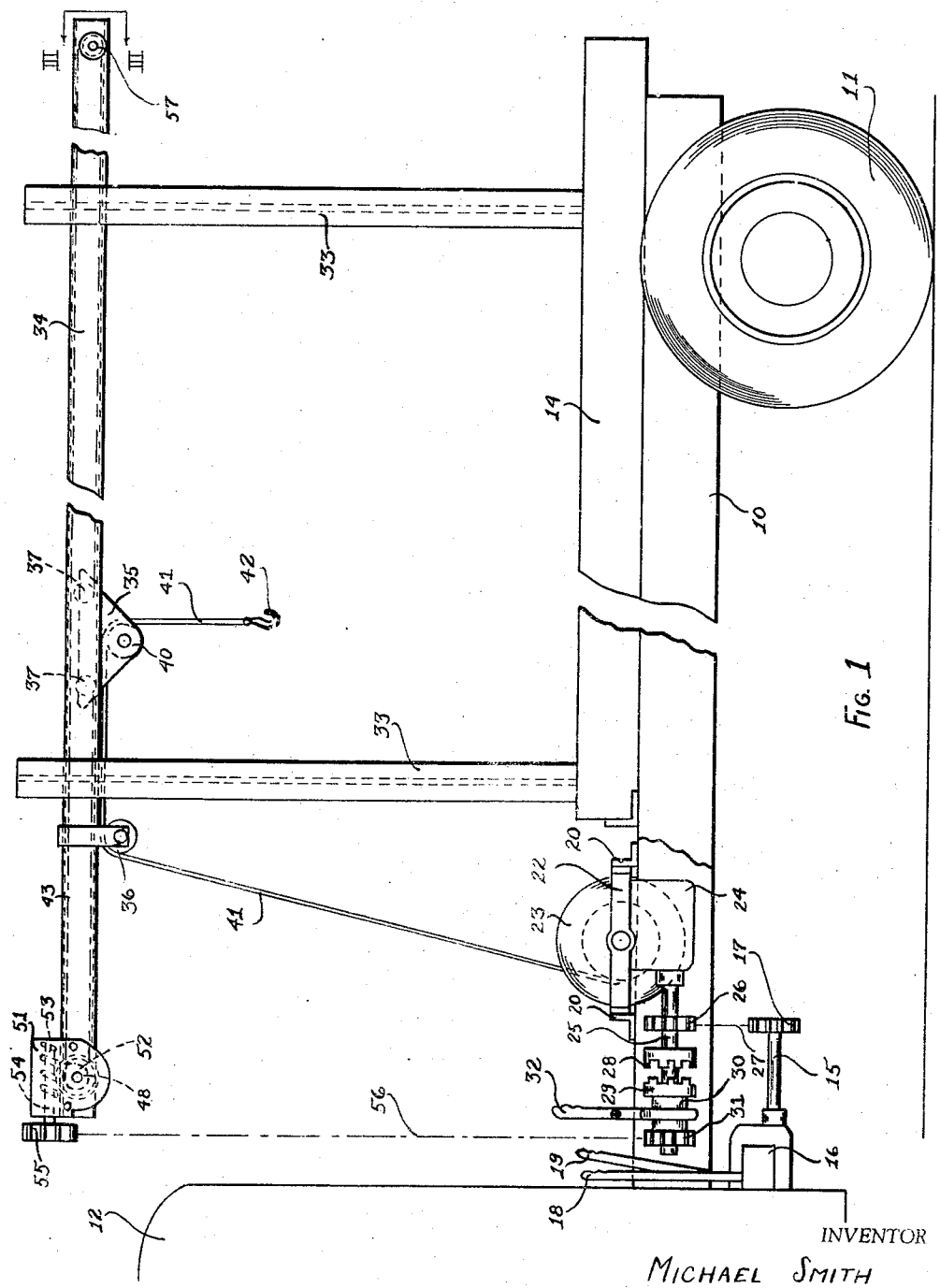
INVENTOR
MICHAEL SMITH
BY *Francis J. Klempay*
ATTORNEY May 6, 1958   M. SMITH   2,833,428
SELF-LOADING AND UNLOADING APPARATUS FOR MOTOR VEHICLES
Filed June 26, 1956   2 Sheets-Sheet 2
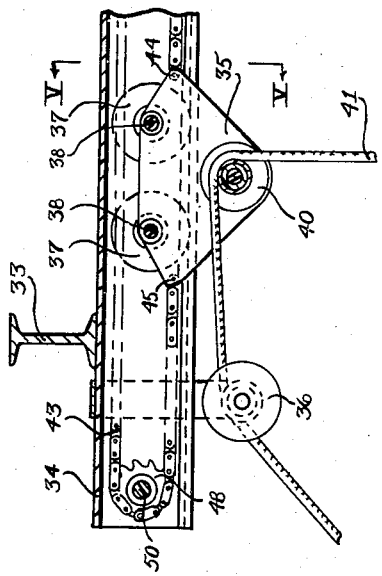
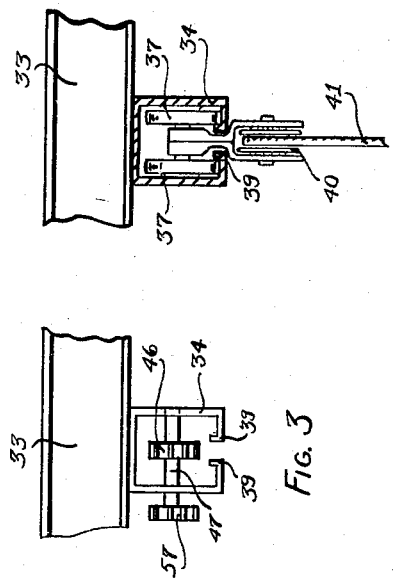
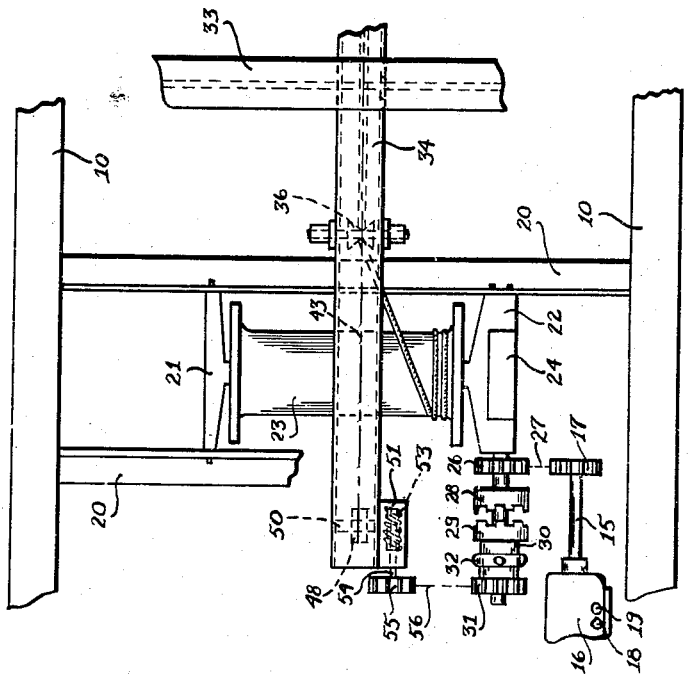
INVENTOR
MICHAEL SMITH
BY Francis J. Klempay
ATTORNEY

United States Patent Office 2,833,428
Patented May 6, 1958

---

2,833,428

SELF-LOADING AND UNLOADING APPARATUS FOR MOTOR VEHICLES

Michael Smith, Youngstown, Ohio

Application June 26, 1956, Serial No. 593,905

3 Claims. (Cl. 214—75)

The present invention relates to cargo-carrying motor vehicles and has to do more particularly with improved apparatus for utilizing the motor vehicle's own power to effect the loading and unloading thereof.

In my prior U. S. Patent No. 2,504,232 there is shown and described self-loading apparatus for motor trucks and the like which greatly increases the utilization of the same since it is unnecessary to provide special loading docks or other means to load the same. In addition, a vehicle so equipped may be employed in carrying out a multiplicity of operations usually reserved for other types of motorized equipment.

According to the teachings of the above identified patent a longitudinally extending rail is supported above the bed of a truck and a trolley hanger is adapted to ride along this rail. A cable sheave is journaled on this trolley hanger and is adapted to receive a cable which is entrained thereover and attached to a cable-receiving drum. A power take-off unit is operative to drive both the drum and the trolley hanger through suitable power interconnecting means whereby the speed of the cable is exactly synchronized with the speed of the trolley hanger as the same moves along the rail.

In such an installation as described above it is necessary to provide means for disengaging the trolley hanger from the power source while still allowing the cable to be taken up or paid out in order to lower or lift an article being handled. It is also requisite that means be incorporated to hold the trolley hanger in any given position, especially when a heavy load is suspended from the lifting cable. In my previous application this was accomplished by the use of a large friction-type brake which was actuated through an independent lever under the control of the operator. I have found, however, that such braking means is not well suited for such an installation since the same must be of prohibitive size to hold the trolley hanger when any appreciable load is supported by the lifting cable. Further, the effectiveness of such braking means is dependent upon the skill of the operator running the apparatus since the brake must be disengaged at exactly the moment the interconnecting means is manipulated to move the trolley hanger and vice versa.

It is therefore the primary object of the present invention to provide self-loading and unloading apparatus for motor vehicles where improved means are integrally incorporated which inherently provide for the holding of the trolley hanger in any position along the rail irrespective of the load being lifted. Another object of the present invention is to provide improved holding and braking means which is operative in an automatic manner and not dependent upon the manipulating skill of the operator for effectiveness. A self-locking and irreversible worm gear assembly is provided in the driving connection for the trolley hanger to accomplish these objects.

Yet a further object of the invention is to provide a motor vehicle equipped with apparatus of the character described with auxiliary power take-off means at the rear of the vehicle which may be used to power ancillary equipage by the vehicles motor.

A more specific object of the invention is to provide improved power interconnecting means for the trolley hanger and the cable-receiving drum. The component parts of the mechanism are arranged in a nesting and compact configuration thereby allowing maximum utilization of the vehicle.

These objects, as well as other objects and advantages of the invention, will become more readily apparent upon consideration of the following detailed specification and accompanying drawing wherein there is described and shown a representative embodiment of the invention.

In the drawing:

Figure 1 is a side view, partially in section, of an assembly of the machinery of the invention illustrated on a truck of the flat-bed type;

Figure 2 is a plan view of the principal parts of the apparatus shown in Figure 1;

Figure 3 is an end view as seen from the section line III—III of Figure 1;

Figure 4 is a sectional view of the rail and trolley hanger utilized in the present invention; and Figure 5 is an end sectional view taken along the section line V—V of Figure 4.

Referring now to the drawing, the reference numeral 10 represents a chassis of a motor truck which is supported by rear wheel 11 in back of a driver's or operator's cab 12. As is the conventional practice the driving motor of the truck is enclosed within a hood, not shown, located in front of the cab 12 while the chassis 10 serves to support the load-carrying bed 14 which is adapted to support cargo during transportation thereof.

Power for the improved apparatus of the present invention is derived from the motor of the truck through the clutch and transmission of the truck and is made to operate a horizontally extending shaft 15 extending from a power take-off unit 16 and carrying a chain sprocket 17 on the outer end thereof. A pair of levers, 18 and 19 respectively, are provided for connecting the power take-off unit in operative relation with the motor of the truck and to provide means for reversing the direction of rotation of the take-off shaft 15.

Supported by the chassis 10 are the spaced parallel and transversely extending angle irons 20 which in turn support a pair of spaced spanning brackets 21 and 22. The brackets 21 and 22 serve to rotatably support a cable drum 23. The bracket 22 also supports a gear box 24 which contains suitable gearing for driving the cable drum 23 and has a forwardly protruding shaft 25. Keyed to the shaft 25 in vertical alignment with the sprocket 17 is another sprocket 26 and these two sprockets are interconnected by means of a continuous chain 27. It should thus be apparent that upon proper actuation of the lever 18 to engage the power take-off unit 16 in operative relation with the motor of the truck that the cable drum will be forced to rotate. The direction of rotation of the cable drum will be under the control of the operator by proper positioning of the lever 19.

Keyed to the shaft 25 forwardly of the sprocket 26 is a collar 28 of a clutch which is adapted to be operatively coupled with a collar 29 mounted on an annular shaft 30 journaled on the shaft 25. Also mounted on the annular shaft 30 is a sprocket 31 and a wishbone-shaped lever 32 is provided intermediate the sprocket 31 and the collar 29 to move this collar into engagement with the collar 28. Thus, the sprocket 31 is effectively coupled with the motor of the truck via the various power transmitting means recited above and the power take-off unit 16 when the levers 18 and 32 are moved to correct positions.

Mounted above the bed of the truck 14 by a plurality of U-shaped members 33 which are preferably made from light weight steel I-beams having their ends attached to opposite sides of the bed 14 is a box-like rail 34. The rail 34 extends out over the rear end of the truck to allow loading and unloading of the same as will be hereinafter more fully explained and serves to carry a movable trolley hanger 35. The trolley hanger 35 comprises two pairs of spaced roller wheels 37 mounted on rods 38 which are adapted to roll freely along the rail 34, being guided by upturned lips 39, and a large bifurcated sheave 40. The sheave 40 serves to direct a lifting cable 41 draped thereover while one end of this cable is attached to the cable drum 23 and the other end carries suitable workpiece gripping means, such as a hook 42 although other means including tongs, clam buckets, etc. are clearly within the scope of the present invention. Suspended from the forward end of the rail 34 is a deeply-grooved sheave 36 which serves to accurately guide the cable 41 in the manner shown.

When the trolley hanger 35 is in stationary position at any point along the rail 34 the hook 42 may be lowered or raised upon proper actuation and rotation of the cable drum 23. For unloading and loading the truck means must be provided for moving the trolley hanger 35 along the rail 34.

To accomplish this end a chain 43 is provided, having its two free ends anchored to the trolley hanger at 44 and 45 and being trained thus: from the trolley hanger at the point 44 to the rear of the rail 34 and around sprocket 46 which is journaled for rotation on a shaft 47 to the front of the rail and around a sprocket 48 and thence back to the anchorage 45 on the trolley hanger. As shown in Figure 3 of the drawing, the sprocket 48 is keyed to a shaft 50 which protrudes from the rail and extends into a worm gear assembly 51 and is operatively coupled with gear 52 thereof. The worm gear assembly 51 is mounted on one side of the rail 34 out of interfering relation with the trolley hanger 35 and the roller chain 43. This assembly also comprises a worm gear 53 which is adapted to mesh with the gear 52 and is mounted on a shaft 54 being generally at right angles to the shaft 50 which mounts the sprocket 48. A sprocket 55 is keyed to the end of the worm gear mounting shaft 54 in the manner shown. It will thus be apparent that upon rotation of the sprocket 55 the sprocket 48 will be caused to rotate via the worm gear assembly 51 to move the trolley hanger along the rail 34. One of the most important features of the present invention is the use of the worm gear assembly 51 since this assembly provides self-locking means for holding the trolley stationary at any position along the rail. The chain 43 may be easily moved by rotating the sprocket 55 in either direction but this driving linkage is irreversible—i. e. the sprocket 55 will not turn if a pulling force is exerted on the chain 43 as, for example, when a heavy load is hoisted above the truck bed on the hook 42—by virtue of the self-locking characteristics of the worm gear assembly. A chain 56 is looped around the sprockets 55 and 31 to interconnect these members and provide driving means for moving the trolley hanger 35 along the rail 34.

Referring specifically to Figure 3 of the drawing, it will be observed that the shaft 47 extends through the sidewall of the rail 34 and a second sprocket 57 is keyed thereto exteriorly of the rail. This sprocket is provided so that by utilizing an auxiliary chain (not shown) a power take-off connection is afforded at the rear end of the truck. When using the sprocket 57 as a powering means for driving auxiliary equipment, it will of course be necessary to remove the trolley hanger 35 and provide linkage means, not shown, to join the ends of the chain 43. This linkage means must be capable of freely passing around the sprockets 46 and 48. Considering now the operation of the apparatus recited above, it will be assumed, for the purpose of illustration, that the collars 28 and 29 are initially disengaged and that the power take-off unit is not operatively coupled with the motor of the truck. It is also assumed that the trolley hanger 35 is in the position shown in Figure 1 of the drawing.

If the operator desires to load an article, not shown, which is sitting on the ground below the level of the bed 14 and to the rear of the truck, the levers 32 and 18 are both manipulated at the same time so that both the cable drum 23 and the sprocket 55 are caused to rotate. The lever 19, of course, will also be shifted to such a position whereby the cable is unwound from the drum 23 and the trolley hanger moves back along the rail 34. If the sprockets 55 and 31 are the same size and the same gear ratios are observed between the worm gear assembly 51 and the gearing in the gear box 24 for driving the drum 23 the cable 41 will be paid out at exactly the same speed as the trolley hanger moves along the rail 34. In this manner the relative height of the hook 42 will remain the same as it is moved to the rear. The requirement that the speed of the trolley hanger and cable be synchronized is especially important since if this is not the case, the hook will move either up or down from its original position as the trolley is moved along the rail 34. Obviously, the arrangement disclosed herein is inherently adapted to meet this requirement since both the drum 23 and the trolley 35 are driven from a common source, in this instance the power take-off unit 16.

After the trolley 35 has reached the end of the rail the lever 32 may be returned to its original position thereby disengaging the collar 29 from the collar 28 and stopping rotation of the sprockets 31 and 55 which in turn will halt the travel of the trolley 35. The drum 23, however, will continue to rotate thus lowering the hook 42 toward the ground. When the hook has been lowered a desired distance the lever 18 is operated to disengage the power take-off unit 16 from the motor of the truck and therefore the lowering of the hook 42 is arrested. The hook may then be attached to the article to be loaded.

With the hook thus attached to the article the operator then shifts the lever 19 and the lever 18 so that the cable drum is rotated in the opposite direction to raise the cable 41. After the article to be loaded has been raised a sufficient distance to clear the bed 14 of the truck the lever 32 may again be manipulated to engage the collars 28 and 29 to cause rotation of the sprocket 55 and as a consequence begin movement of the trolley hanger 35 toward the cab 12. Of course, the hook 42 will stay in the same relative vertical position as the trolley hanger moves along the rail due to the synchronization between the speed of the trolley hanger and the take-up speed of the cable drum 23. After the hook 42 and article have moved inwardly to a desired position the lever 32 can again be positioned to stop the movement of the trolley hanger and the article lowered to the bed of the truck by reversing the direction of rotation of the drum 23.

In many instances it may be necessary to hold an article suspended above the bed of the truck, ground or loading platform while some other operation is being carried out. Consequently it is particularly important that the apparatus and mechanism employed be operative to retain the load in this position. In the present embodiment the above condition is adequately provided for by the use of the worm gear assembly 51 since this unit is irreversible in its operating characteristics.

Another important advantage of the present invention is the provision of the sprocket 57 at the rear of the trolley rail on the exterior thereof to provide a power take-off connection at the rear of the truck. By replacing the trolley hanger with appropriate linkage means adapted to move freely around the sprockets mounted within the rail the sprocket 57 may be used to power appurtenant equipment. In this mode of operation both the levers 18 and 32 would be properly manipulated to interconnect the power take-off 16 with the sprocket 57.

In addition to other advantages, it will be particularly apparent that the apparatus of the present invention is characterized by its extreme simplicity in construction with the component parts thereof arranged in a nesting and compact relation. The chain 56 is positioned in the plane of the rear wall of the cab 12 and it will be apparent to those skilled in the art that the parts may be easily grouped to occupy a minimum amount of space to allow maximum utilization of the truck.

Although I have shown and described a preferred embodiment of the invention, many changes may be made therein without departing from the scope of the invention. As an example, the hook may be replaced with a clam bucket or other means for excavating, etc. Reference should therefore be had to the following appended claims in determining the scope of the invention.

I claim:

1. A loading and unloading attachment for a motor truck having a load-bearing bed comprising in combination a framework extending above said bed, a rail suspended from said framework longitudinally above said bed and extending longitudinally beyond one end of said bed and said framework, a sprocket journaled at each end of said rail, a trolley hanger movable along said rail intermediate said sprockets, a cable sheave journaled on said trolley hanger, a cable sheave suspended from said rail adjacent the forward end thereof, a cable-receiving drum journaled on said motor truck, a cable entrained over said sheaves and received on said drum, a chain extending over said sprockets and having its ends attached to said trolley hanger, a worm gear assembly operatively coupled with one of said sprockets and mounted on the forward end of said rail, said worm gear assembly having a protruding shaft extending generally normal to the axes of said sprockets, a third sprocket mounted on said protruding shaft, a power take-off and means to drive said take-off by the motor of the truck, driving means interconnecting said drum and said take-off, and second driving means interconnecting said first mentioned drive means and said third sprocket including a clutch and fourth sprocket whereby said first mentioned sprockets may be driven at a speed synchronized with the movement of said cable.

2. Apparatus according to claim 1 further characterized in that said attachment further comprises a fifth sprocket mounted exteriorly of said rail near the rear end thereof and operatively coupled with said first mentioned sprockets whereby a power take-off connection is afforded at the rear of the motor truck.

3. A loading and unloading attachment for a motor truck comprising a load-bearing bed and a framework extending longitudinally above said bed and forming an elevated track, a trolley movable along said track and mounting a cable sheave in depending relation thereto, a sprocket journaled at each end of said track and a chain entrained over said sprockets and having its ends attached to said trolley, a cable having a reach extending longitudinally rearward along said track and entrained over said sheave to provide a depending end portion adapted to support a load, a drum receiving the forward end portion of said cable and adapted upon rotation to either raise and lower said depending end portion or to lengthen and shorten said reach depending on whether said trolley is stationary or moving during rotation of the drum, means to drive the forward sprocket comprising an irreversible worm gear, means to drive said drum comprising a second irreversible worm gear, a mechanical power source comprising a reversible driven shaft, means to connect said shaft to the input of said second worm gear, and means comprising a disconnecting clutch to drive the input of said first mentioned worm gear synchronously with the input of said second worm gear.

References Cited in the file of this patent

UNITED STATES PATENTS

| | | |
|---|---|---|
| 1,025,287 | Mattson | May 7, 1912 |
| 2,730,249 | Edwards | Jan. 10, 1956 |
| 2,751,095 | Haverstick et al. | June 19, 1956 |

FOREIGN PATENTS

| | | |
|---|---|---|
| 147,386 | Sweden | Oct. 17, 1954 |